United States Patent
Smart

(10) Patent No.: US 9,872,489 B2
(45) Date of Patent: Jan. 23, 2018

(54) DECOY WITH SELECTIVELY DEPLOYABLE KEEL

(71) Applicant: Huntwise, Inc., Monroe, LA (US)

(72) Inventor: Charles L. Smart, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 32 days.

(21) Appl. No.: 14/537,240

(22) Filed: Nov. 10, 2014

(65) Prior Publication Data

US 2016/0128319 A1    May 12, 2016

(51) Int. Cl.
*A01M 31/06*    (2006.01)

(52) U.S. Cl.
CPC .................... *A01M 31/06* (2013.01)

(58) Field of Classification Search
None
See application file for complete search history.

(56) References Cited

U.S. PATENT DOCUMENTS

| | | | |
|---|---|---|---|
| 1,923,442 A * | 8/1933 | Kilgore | A01M 31/06 43/3 |
| 3,798,820 A * | 3/1974 | Dye | A01M 31/06 43/3 |
| 3,834,054 A | 9/1974 | Gentry et al. | |
| 4,658,530 A | 4/1987 | Ladehoff | |
| 5,934,962 A | 8/1999 | Daum et al. | |
| 6,470,621 B2 | 10/2002 | Murray et al. | |
| 6,748,690 B2 | 6/2004 | Igo | |
| 7,421,819 B2 | 9/2008 | Zink, Jr. | |
| 7,634,867 B2 | 12/2009 | Bill | |
| 7,941,962 B2 | 5/2011 | Wood et al. | |
| 2015/0059227 A1 * | 3/2015 | Kubinec | A01M 31/06 43/2 |

* cited by examiner

*Primary Examiner* — Kristina N Junge
(74) *Attorney, Agent, or Firm* — Robert Devin Ricci; Kean Miller LLP

(57) ABSTRACT

A decoy with selectively deployable keel for positioning at or near the surface of a body of water comprising: an at least partially buoyant structure wherein the at least partially buoyant structure at least partially resembles the shape of an animal, and at least one selectively deployable keel component which is attachable to said at least partially buoyant structure. In one or more embodiments, the at least partially buoyant structure comprises a waterfowl decoy body with a head and neck region, a midsection, an aft, and a bottom surface with a cavity, and the at least one selectively deployable keel component is attached to the bottom surface so as to be deployable when the added stability of a keel component is desired and retractable when not desired, such as for storage.

22 Claims, 3 Drawing Sheets

DECOY WITH SELECTIVELY DEPLOYABLE KEEL

CROSS REFERENCE TO RELATED APPLICATIONS

This application does not claim priority to any prior filed applications.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM

Not applicable.

BACKGROUND

Outdoor enthusiasts, recreational hunters, and photographers have long recognized that live animals and game, and particularly live waterfowl, are attracted to areas that appear to be inhabited by similar animals. For this reason, hunters have used decoys to attract live game to within shooting distance of a hunter's rifle, shotgun or other weapon, and within prime viewing distance of photographers and other outdoor enthusiasts. Likewise, decoys and other animal-shaped structures are also often used to deter certain animals from entering into an area such as an owl or hawk shaped decoy employed to keep mice away from an area. For decoys that are to be situated at or near the water's surface, the overall ability for the decoy to attract or deter the intended game is directly related to and influenced by the decoy's ability to properly float on the water and handle external factors such as current, wave conditions, and wind.

Traditional decoys are often tethered to an external object in such a manner that their position is relatively stationary and their retrieval is readily achievable. Ideal conditions for the use of traditional floating decoys comprise low winds and little to no current or wave action, allowing the decoys to float evenly on the water's surface. However, floating decoys are often used or desired to be used in less than ideal conditions which reduce the effectiveness of traditional decoys. For example, enhanced winds and currents would impact the manner in which the decoy would float and otherwise sit in the water, stifling the decoy's ability to attract the intended game. The winds and current will exert forces counter to the tether, causing the decoy to exhibit an unnatural lean. It is therefore desirable to create and develop a single decoy device which is capable of being effectively used in ideal conditions as well as in less than ideal conditions.

The use of keels is well known in the nautical industry. In terms of nautical structures, a keel is generally an extension which projects from the nautical structure to help provide stability to the structure, often by lowering the center of mass of the nautical structure. A number of inventions have been developed over the years that utilize a general keel structure in conjunction with a decoy in order to help provide a floating decoy which is capable of being used in the less than ideal conditions discussed herein. For example, U.S. Pat. Nos. 3,834,054, 6,470,621, 6,748,690, and 7,941,962 generally teach decoy devices which utilize a keel component to combat less than ideal conditions.

While other decoy systems have attempted to overcome the shortcomings of the traditional floating decoy by incorporating a keel component to the system, most have shortcomings of their own. For example, all four of the previously referenced patents utilize external keel components which are only capable of being attached to the decoy in a deployed position. These systems falter in terms of both storage and anticipation of use. The keel components discussed in these patents are generally limited to two states, either attached to the decoys in a fully deployed state or detached completely from the decoys, thereby limiting the effectiveness of the decoy in terms of anticipated both use and storage. Consider, for example, that when external conditions do not require or suggest the use of a keel, the keel component of the prior art would generally be separated from the decoy, enhancing the potential for the components to be misplaced. Storing the decoy and keel components of the prior art pose practical limitations and issues because the devices can either be stored in one of two ways: (1) with the keel component attached to the decoy, reducing the risk of losing the keel component, but increasing the bulk of the device and hindering effective storage, or (2) with the keel component separated from the decoy, increasing the likelihood of misplacing components. Furthermore, it is also noted that separating the keel component from the decoy also increases the likelihood that the keel component may be absent or otherwise out of reach when its use is desired, such as when conditions worsen during operation of the decoy.

Under ideal conditions, a keel component may not be required and often may not be desired to be deployed because the keel may, under such conditions, cause the decoy to exhibit an unnatural lean. Therefore, a goal of at least one embodiment is to provide a decoy with a selectively deployable keel wherein the keel is capable of being placed in a non-deployed state such that the decoy would float in substantially the same manner as it would if the keel component were not attached. However, should conditions change whereby the use of the keel is desired, the keel in such an embodiment remains attached to the decoy for easy deployment.

As can be seen from the above discussion, the prior art has largely failed to capitalize on a floating decoy device that is inexpensive, yet durable and adaptable so as to be readily usable under varying conditions. Therefore, what is needed is a device that overcomes the shortfalls of the prior art. Specifically, what is needed is a device that properly caters to external conditions and also provides efficient storage when the device is not in use. These and other, further and more specific objects and advantages of the present invention will become readily apparent to those skilled in the art following detailed description thereof, taken in conjunction with the drawings.

DESCRIPTION OF THE DRAWINGS

The drawings constitute a part of this specification and include exemplary embodiments of the decoy with selectively deployable keel, which may be embodied in various forms. It is to be understood that in some instances, various aspects of the invention may be shown exaggerated or enlarged to facilitate an understanding of the invention. Therefore the drawings may not be to scale. Like elements may be numbered alike or not at all, in which.

DETAILED DESCRIPTION

Figure 1:
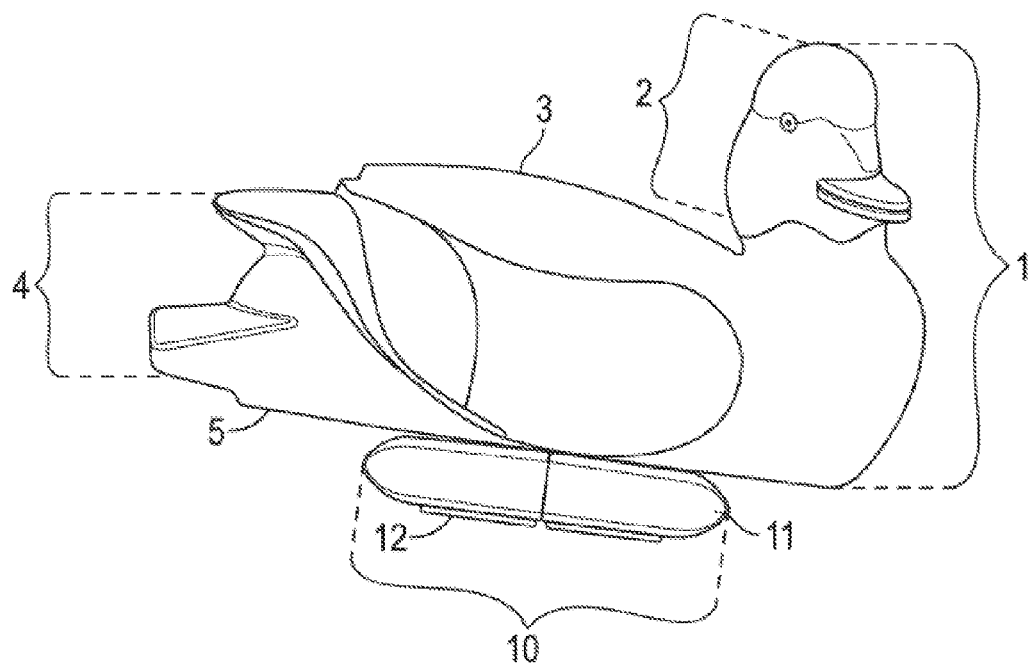
FIG. 1 is a side view of a decoy with deployable keel wherein the keel is fully deployed.

The subject matter of the present invention is described with specificity herein to meet statutory requirements. The embodiments as depicted in the drawings and described herein disclose a decoy with a selectively deployable keel which may be used in the attraction of game such as for hunting. However, it should be specifically noted that various additional embodiments, features, and improvements to the generally described attributes of the decoy with deployable keel would be readily apparent to one having ordinary skill in the art. Therefore, the description itself is not intended to necessarily limit the scope of claims. Rather, the claimed subject matter might be embodied in other ways to include different components or combinations of components similar to the ones described in this document, in conjunction with other present or future technologies.

Furthermore, the described features, structures, or characteristics may be combined in any suitable manner in one or more embodiments. In the following description, numerous specific details are provided, such as examples of buoyant structures, decoy bodies and shapes, attachment means, securing means, keel components and apparatuses, locking means and pulley devices. One skilled in the relevant art will recognize, however, that a decoy with deployable keel may be practiced with or without one or more of the specific details, or with other methods, components, materials, and so forth. In other instances, well-known structures, materials, or operations are not shown or described in detail to avoid obscuring aspects of the invention.

As used herein, the term "selectively deployable keel" refers to a keel or keel component which is capable of being manipulated from a non-deployed state to a deployed state and vice versa, as desired by a user. As used herein, the term "deployed state" refers to the position of a keel or keel component connected either directly or indirectly to the decoy wherein the keel or keel component extends from the decoy such that it is capable of engaging with the water or other medium in which the decoy is located so as to aid in stabilizing the decoy. As used herein, the term "non-deployed state" refers to the position of a keel or keel component connected either directly or indirectly to the decoy wherein the keel or keel component is either substantially parallel to or at least partially retracts into the base of the decoy.

Turning to the drawings, FIG. 1 is a side view of a decoy unit 1 with a selectively deployable keel 10 wherein the keel 10 is in a deployed state. The main body shape of decoy unit 1 is provided in the shape of a desired waterfowl in a desired pose as is understood and known to those having ordinary skill in the art. The decoy unit 1 may be provided in a variety of body styles and designs, with the shape and texture of the waterfowl's body, head, and feathers as well as any coloring scheme applied thereto being a matter of design choice. Decoy unit 1 is an at least partially buoyant structure which is molded or constructed from polystyrene and other suitable plastics, monomers, or even organic materials such as wood. Suitable materials and methods for forming these materials into an at least partially buoyant decoy are generally known and available to persons having ordinary skill in the art. For example, it is well known in the art that the decoy unit may comprise a buoyant core or base with a decorative or molded exterior in the shape of an animal or may otherwise be formed entirely out of buoyant materials.

As embodied in FIG. 1, decoy unit 1 comprises a head and neck region 2, a body section 3 which comprises the front end (the bust) and mid-section of a waterfowl, an aft section 4 which generally resembles the tail feathers of a waterfowl, and a base 5. It should be noted that while the depicted embodiments of the decoy unit employ features which give the general resemblance of a waterfowl, other embodiments are readily conceivable which would give the general resemblance of various types of animals including but not limited to other game animals, ungulates, other avian animals, reptiles, mammals as well as any other animal which may appear at or near a body of water. It is further possible and even likely that other embodiments would exist which resemble only a portion of an animal, while others may resemble an entire animal's shape or appearance, as these features would generally be considered a matter of design choice. Furthermore, the one or more of the aforementioned components which comprise the decoy unit 1 may also exist as separate components which are attached together to form one unit.

Figure 4:
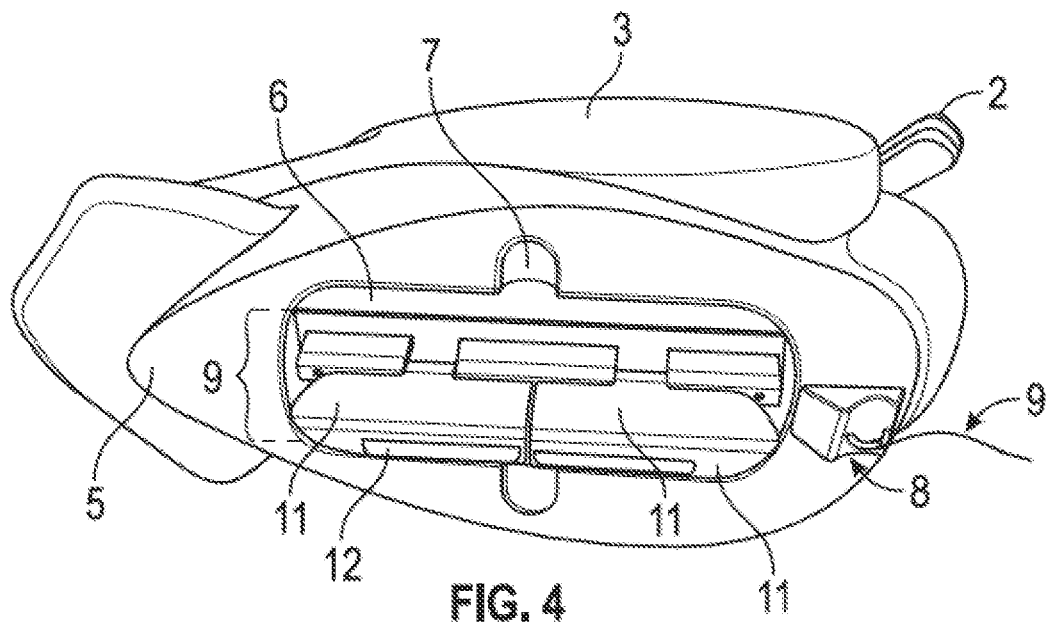
FIG. 4 is a diagonal base view of a decoy with deployable keel wherein the keel is fully deployed.

As depicted in the embodiments of FIGS. 2, 4, 5, and 6, also present on the base 5 of decoy unit 1 is a tether unit 8 which is an eyelet connector that allows for the decoy unit to be tethered via a string or chord (not depicted) to an external object such as a duck blind to help keep the decoy's position relatively stationary and provide for easy retrieval. The tether unit could be attached to the decoy unit in any of a number of locations. Under less than ideal conditions, external factors such as wind and current could influence the decoy, causing it to move away from the external object. The opposing forces acting on the decoy from the tether and from the external factors are likely to cause the decoy to exhibit an unnatural lean or exhibit other behaviors which would diminish the decoy's effectiveness. To aid in countering this effect, and to otherwise provide a well-balanced decoy, there is provided a selectively deployable keel unit 9 attached to the base 5 of the decoy unit 1. Turning to FIG. 4, the selectively deployable keel unit 9 of the present embodiment comprises keel components 11, which when one or more keel components 11 are deployed in unison form keel 10, and attachment means which connect the keel components 11 to the decoy unit 1.

The base 5 of the decoy device 1 generally defines an opening, cavity 6. Cavity 6 has longitudinally extending sides which extend from a point in the front end of the decoy device 1 towards the aft section. Cavity 6 is molded into base 5 of the decoy unit 1 and is capable of housing at least a portion of the deployable keel unit 9, particularly when the keel components 11 are in the non-deployed state. Although cavity 6 is generally depicted in the Figures to be shaped as a rectangular structure with rounded edges which runs longitudinally along the bottom of the decoy, many different configurations exist for the cavity and contained deployable keel unit 9. The cavity can be formed into many different shapes and configurations which may or may not directly correspond with the shape and configuration of the deployable keel unit 9 so long as the cavity is capable of housing the keel components 11 when they are in the non-deployed state. Furthermore, the cavity may run either longitudinally or latitudinal depending on the desired configuration of the deployable keel unit. Moreover, although illustrated herein as a single cavity, one skilled in the art would understand that the base 5 of the decoy unit 1 might alternatively have a plurality of cavities spaced across the base, each housing a deployable keel unit. It would likewise be appreciated than an embodiment of a decoy with a selectively deployable keel could exist wherein no cavity is formed in the base, but rather the deployable keel unit 9 would be connected to the base 5. In such an embodiment, the non-deployed state would likely find the keel component parallel to the base of the decoy or removed from the water entirely.

Figure 5:
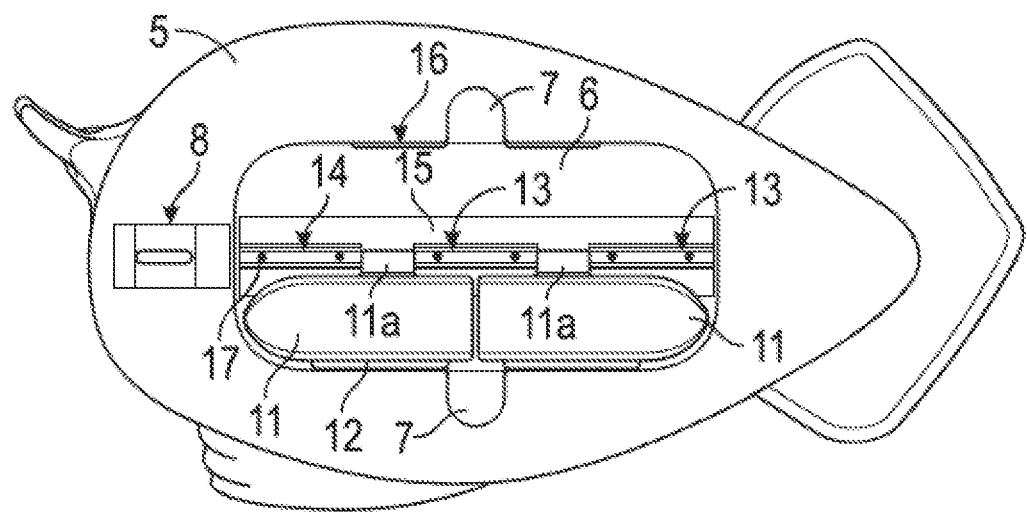
FIG. 5 is a base view of a decoy with deployable keel wherein the keel is in a non-deployed position whereby the keel components are positioned on the same side of the hinge body.
Figure 6:
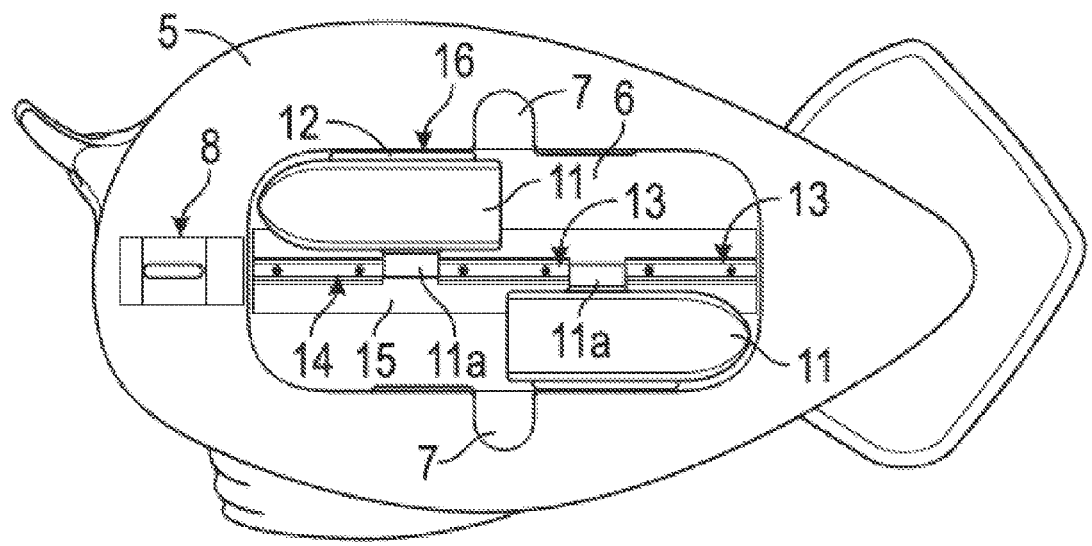
FIG. 6 is a base view of a decoy with deployable keel wherein the keel is in a non-deployed position whereby the keel components are positioned on opposite sides of the hinge body.
Figure 7:
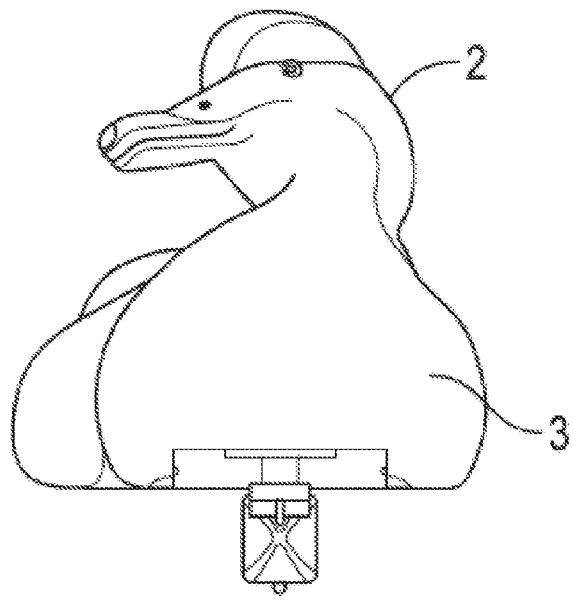
FIG. 7 is a frontal view of a decoy with deployable keel showing both the outer shell of the decoy, the outline of the keel cavity, the keel and a deployed keel.

Turning to FIGS. 4-6, base views of decoy unit 1 with attached deployable keel unit 9 are shown. Deployable keel unit 9 comprises keel components 11, when one or more keel components 11 are deployed in unison form keel 10 and attachment means which connect the keel components 11 to the decoy unit 1. As shown in the Figures, keel 10 is formed from multiple deployed keel components 11, including a frontal keel component and an aft keel component. In the present embodiment wherein two similarly shaped keel components 11 are employed, the keel components align when in the deployed state so that the rear of each component substantially abuts or aligns. However, a person having skill in the art would recognize that keel 10 could comprise either a single keel component or a plurality of keel components each of which could be selectively deployed as desired by the user under the conditions faced.

In the present embodiment, keel components 11 are elongated structures which are capable of providing at least partial stability to the decoy when in the deployed state. To provide stability when in the deployed state, the keel components are weighted such that when one or more keel components is deployed, it lowers the center of mass of the decoy unit. In the present embodiment, keel components 11 each comprise an elongated plastic structure defining a cavity which can be at least partially filled with an object such as sand so as to provide additional weight to the keel component. Other embodiments of the decoy with selectively deployable keel may utilize components or substrates other than sand to supply weight to the keel component. By way of example, it would be appreciated that the keel components could comprise elongated extruded plastic structures which house a metallic bar acting as keel weight. Likewise, the keel component structure itself could be formed of a weighted material such that the component itself supplies the desired weight. It would further be appreciated that the keel components could be molded or constructed from polystyrene and other suitable plastics, monomers, or organic materials such as wood.

Turning to FIGS. 2-6, it is shown that on the base 5 of the decoy unit 1 is an attachment mechanism for attaching the keel components 11 to the decoy unit 1 in a manner which allows for the keel components to be selectively deployed. Deployable keel unit 9 comprises the keel components 11 as well as the attachment mechanisms which attach the keel components 11 to decoy unit 1 in cavity 6 of base 5. In the present embodiment, the attachment mechanism is a hinge system comprising a base hinge plate 15 with hinge bodies 13 that extend outwards from the base hinge plate and mate with the hinge pin structures which form keel connectors 11a. As depicted, keel hinge bodies 13 comprise separated hinge bodies connected to base hinge plate 15, forming a single unit. Keel connectors 11a are hinge pin structures which are formed into the tops of keel components 11.

Figures 2, 3:
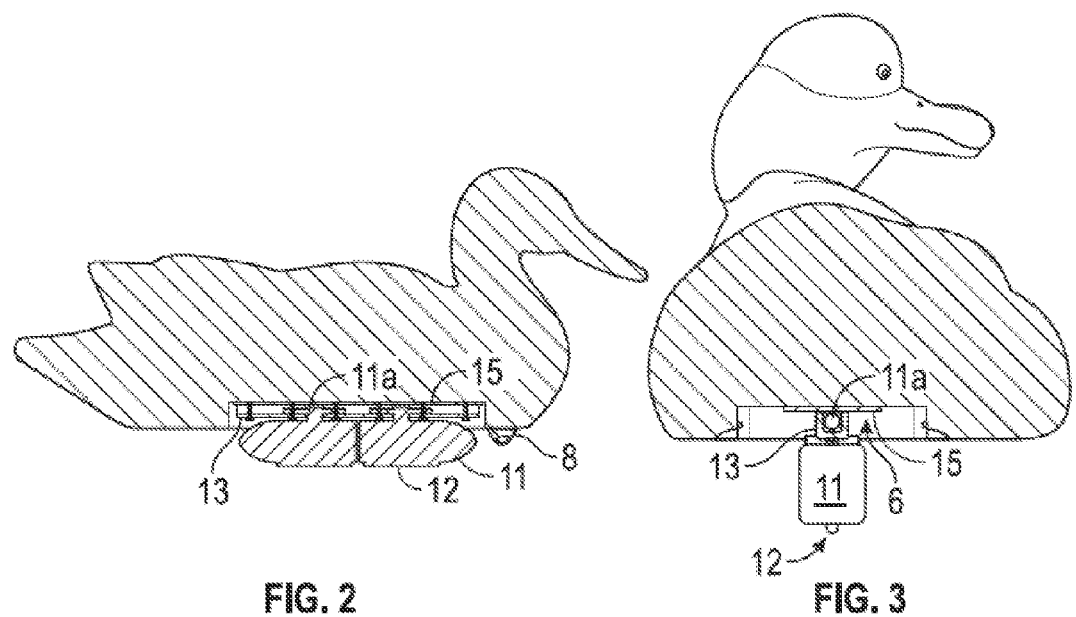
FIG. 2 is a side view of the cross section of a decoy with deployable keel wherein the keel is fully deployed.
FIG. 3 is a frontal view of the cross section of a decoy with deployable keel wherein the keel is fully deployed.

Turning specifically to FIGS. 2 and 3, a side and front cross section view of the decoy unit 1 is presented to demonstrate the present embodiment of the attachment mechanism for attaching the keel components 11 to the decoy unit 1. In the present embodiment, hinge bodies 13 comprise tubular sleeve structures which are connected to base hinge plate 15, creating a tunnel of partially separated sleeves with openings between the hinge bodies 13. Three partially separated hinge bodies 13 including a front hinge body, a middle hinge body and an aft hinge body, are positioned in a substantially linear plane to create the sleeved tunnel with openings. The tunnel formed between base hinge plate 15 and hinge bodies 13 is diametrically greater than that of the hinge pins comprising keel connectors 11a. Gaps are created between the hinge bodies so that keel connectors 11a are capable of being at least partially inserted into and housed within the sleeve tunnel. Turning specifically to FIG. 2, in the present embodiment, keel connector 11a comprises a hinge pin connected to the top of the keel component, which extends in opposing directions from the point of connection to the keel component. The hinge pin comprising keel connector 11a of the forward keel component 11 is inserted into and spans the opening between the sleeves of forward hinge body and middle hinge body. Likewise, the hinge pin (keel connector 11a) connected to aft keel component 11 is inserted into and spans the opening between the sleeves of middle hinge body and aft hinge body. Obviously, it would be appreciated that should more keel components be desired, the number of hinge bodies could likewise be increased to supply adequate attachment means. The presently embodied attachment means which incorporates a general hinge design is particularly adept for generating the selective deployment of the keel components by allowing the keel components to rotate on the hinge formed between the keel connectors and hinge bodies back and forth between the deployed and non-deployed states. However, it would be appreciated that the hinge system depicted herein is only one example of a suitable attachment mechanism for connecting the keel components to the decoy unit in a manner which would allow it to be selectively deployable. For example, it is readily conceivable that numerous forms of attachment means such as alternate forms or styles of hinges and hinge systems, clips, ties, rivets, catches, sliding means whereby the keel component would slide in and out of a crevice in the decoy body, rotational mechanisms, and the like could be employed in alternate embodiments which would allow for the keel components to be selectively deployable.

Turning back to FIG. 5, base hinge plate 15 is attached, either removably or irremovably, to base 5 in or near cavity 6 via deployable keel unit attachment means 17. The deployable keel unit attachment means 17 comprise screws which as depicted are screwed through receptor slots in hinge bodies 13 and base hinge plate 15, and into the base 5 of the decoy unit. In alternate embodiments, the base plate could be secured to the base via alternate attachment means, both permanent and removable, including but not limited to epoxies, welding, fusion, sonic welding, rivets, clips, fasteners, ties, and the like. Furthermore, in additional alternate embodiments, the attachment means such as the hinge bodies for the hinge systems could be molded, fused, welded, or otherwise formed directly into the base 5 of the decoy unit 1, removing the need for base hinge plate 15 entirely.

Turning to FIGS. 5 and 6, a decoy is shown with keel components 11 in the non-deployed state. Decoy unit 1 employs locking means to prevent the keel components from deploying when it is desired that the components remain in the non-deployed state. In the present embodiment, the non-deployed state locking means comprise a friction fit between ridges 16 on the sidewall of cavity 6 and keel nib 12 which is formed into the keel component parallel to the keel connectors 11a. When the user desires for the keel component 11 to remain in the non-deployed state, he will apply sufficient force to manipulate the keel component 11 and cause it to rotate on the hinge connection formed between hinge body 13 and keel connector 11a such that the keel nib 12 will move past the corresponding ridge 16, locking the keel component in the non-deployed state via a friction fit. In alternate embodiments, the locking means may comprise catches, latches, slides, fasteners which are capable of being unfastened, ties, snaps, clasps, magnets, tabs and other like components which are capable of preventing the keel components from deploying when it is desired that the components remain in the non-deployed state, but allowing the keel components to deploy when desired.

Under certain conditions, it may be desirable to deploy the keel components to help stabilize the decoy. To facilitate the manipulation of the keel components 11 from the non-deployed states as depicted in FIGS. 5-6 to the deployed state as depicted in FIGS. 1-4 and 7, slots 7 are provided in the present embodiment. Slots 7 comprise access ports which as embodied are notches or ridges formed in base 5 along the sides of cavity 6 which allow a user to insert an object or the user's fingers to easily access the keel components 11 when the components are in the non-deployed state so that the user can exert sufficient force to counter the locking means and manipulate the keel components into a deployed state by rotating along the hinge connection. In the present embodiment, the keel unit 9 further comprises a deployed state securing means 14 which helps secure the keel component in the deployed state substantially orthogonal to the base 5. By substantially orthogonal, it is meant that the keel component is positioned at an angle between 60 and 90 degrees relative to the plane of the base. As depicted, deployed state securing means 14 comprises a trough-like indentation on the external most side of hinge bodies 13 in relation to the base in which keel components 11 rest while in the deployed state, preventing them from substantially rotating into the non-deployed state. Although the securing means embodied in the depictions employ a friction fit catch of sorts, it is likewise possible for the securing means to comprise mechanical securing means such as catches, latches, slides, fasteners which are capable of being removably fastened, ties, snaps, clasps, magnets, tabs and other like components which are capable of preventing the keel components from retracting when it is desired that the components remain in the deployed state, but allowing the keel components to retract into the non-deployed state when desired.

In a given situation, various modifications may be included for this device including various modifications of the shape, size, weight or composition of the keel components or the degree to which the keel components are deployed. Additional advantages can be realized by utilizing multiple keel components, even under conditions which do not require the keel to be deployed. For example, as best seen in FIG. 6, the use of multiple keel components allows a user to balance the weight of the keel components when the components are in the non-deployed state. As depicted therein, the keel components are balanced along the longitudinal axis of the decoy wherein the frontal keel component rests in the non-deployed state on one side of the decoy while the aft keel component rests in the non-deployed state on the alternate side of the decoy unit 1, substantially balancing the weight affecting decoy unit 1. With the keel components balanced on alternate sides of the decoy, decoy unit 1 will be able to float evenly on the surface of the water and will not be negatively influenced by the keel components so as to exhibit an unnatural lean. Therefore, deployable keel unit 9 is capable of being attached to decoy unit 1 in such a manner that is continuous presence will not substantially interfere with effective usage of the decoy under conditions when the keel is not needed or desired, but will continue to be present and available should its use be desired. Moreover, when storing the decoy unit 1, deployable keel unit 9 can remain attached to the device without substantially affecting the bulk of the device, greatly increasing the ease of storage.

For the purpose of understanding the decoy with selectively deployable keel, references are made in the text to exemplary embodiments of an decoy with selectively deployable keel, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the decoy with selectively deployable keel may be practiced without one or more of the specific features or advantages of a particular embodiment. In other instances, additional features and advantages may be recognized in certain embodiments that may not be present in all embodiments.

Reference throughout this specification to "one embodiment," "an embodiment," "in the present embodiment," or similar language means that a particular feature, structure, or characteristic described in connection with the embodiment is included in at least one embodiment. Thus, appearances of the phrases "in one embodiment," "in an embodiment," "in the present embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A decoy apparatus comprising:
   a. an at least partially buoyant structure which at least partially resembles the shape of an animal, wherein said at least partially buoyant structure comprises a base, said base generally defining a cavity; and
   b. at least two selectively deployable keel components, wherein at least a majority of the selectively deployable keel components is capable of being housed in the cavity when the selectively deployable keel components are in the non-deployed position; and wherein the selectively deployable keel components are separately attached to said at least partially buoyant structure via attachment means so as to allow each selectively deployable keel component to be moved from a deployed state to a non-deployed state irrespective of each other and wherein each of the selectively deployable keel components are positioned along the base such that the weight of each keel component will not substantially impact the decoy's overall weight distribution when the keel component is in the non-deployed state;
   c. wherein each at least two selectively deployable keel components is separately attached to said at least partially buoyant structure in the cavity via the attachment means so that one selectively deployable keel component is housed on one side of the decoy apparatus while the other selectively deployable keel component is housed on the other side of the decoy apparatus.

2. The decoy apparatus of claim 1 wherein the at least partially buoyant structure comprises the shape of at least a portion of a waterfowl.

3. The decoy apparatus of claim 1 wherein said attachment means comprises a hinge system.

4. The decoy apparatus of claim 1 wherein said attachment means comprises a hinge system further comprising at least one hinge body, wherein at least one hinge body is connected to the base in said cavity, and wherein said at least one selectively deployable keel component further comprises at least one keel component connector which mates with said at least one hinge body forming said hinge system.

5. The decoy apparatus of claim 4 wherein the hinge body further comprises two sides, an interior side connected to the base and an exterior side opposite the interior side, an indentation on the side opposite the side of the hinge body connected to the base in which the at least one selectively deployable keel component rest while in the deployed state to maintain the keel component in the deployed state.

6. The decoy apparatus of claim 1 wherein the at least one selectively deployable keel component is substantially orthogonal to the base when said at least one selectively deployable keel component is in the deployed state.

7. The decoy apparatus of claim 1 further comprising a non-deployed state locking means capable of maintaining the at least one selectively deployable keel component in the non-deployed state when so desired by a user.

8. The decoy apparatus of claim 1 further comprising a deployed state securing means which is capable of maintaining the at least one selectively deployable keel component in the deployed state when so desired by a user.

9. The decoy apparatus of claim 1 wherein said at least one selectively deployable keel component is permanently attached to said at least partially buoyant structure via said attachment means.

10. The decoy apparatus of claim 1 wherein the at least two selectively deployable keel components are capable of being deployed in unison and aligned to form a keel unit.

11. The decoy apparatus of claim 1 wherein each selectively deployable keel component is capable of being positioned in the non-deployed state such that the weight of each keel component will not substantially impact the weight distribution of the decoy along its longitudinal axis.

12. The decoy apparatus of claim 1 wherein said cavity further defines at least one ridge which interacts with at least a portion of said at least one selectively deployable keel component when the keel component is in the non-deployed state so as to cause a friction fit that maintains the keel component in the non-deployed state until acted upon by an external force by a user.

13. The decoy apparatus of claim 1 wherein a tether unit is attached to said at least partially buoyant structure.

14. The decoy apparatus of claim 1 wherein said base further defines an at least one access port in at least one side wall of said cavity which allows for access to a keel component when the keel component is in the non-deployed state.

15. The decoy apparatus as in claim 1 wherein said cavity is positioned such that a substantially equal amount of said cavity resides on each side of the decoy base along its longitudinal axis wherein the amount is selected from a group comprising surface area, volume, or a combination of the surface area and volume.

16. The decoy apparatus as in claim 1 further comprising a deployed state securing means integrated into the keel attachment means which is capable of maintaining the at least one selectively deployable keel component in the deployed state when so desired by a user.

17. The decoy apparatus of claim 16 wherein the attachment means comprises an interior side that contacts the base and an exterior side opposite the interior side, wherein the attachment means comprises a deployed state securing means on the external side further comprising a groove or trough-like indentation in which at least a portion of at least one keel component is capable of resting while in the deployed state.

18. The decoy apparatus of claim 1 wherein the at least two selectively deployable keel components are aligned along the longitudinal axis of the base when deployed in unison.

19. The decoy apparatus of claim 18 wherein the at least two selectively deployable keel components further comprise two ends wherein at least one end of each selectively deployable keel component abuts at least one end of the other selectively deployable keel component.

20. A decoy device comprising:
   a. An at least partially buoyant structure shaped to resemble at least part of an animal's body which further comprises a top region and a base region, wherein said base region generally defines a cavity formed in said base region wherein the cavity is positioned such that a substantially equal amount of said cavity resides on each side of the base along its longitudinal axis, wherein the amount is selected from a group comprising surface area, volume, or a combination or of the surface area and volume, and wherein said cavity comprises a sidewall;
b. A deployable keel unit that is capable of being moved from a deployed state to a non-deployed state and comprises at least two keel components wherein when the keel components are deployed in unison, they align along the longitudinal axis of the base region and wherein each keel component has a corresponding keel connector so that each keel may be deployed irrespective of the other and stored on one side or the other of the cavity irrespective of the other keel component and without substantially affecting the weight of the overall decoy device;
wherein said deployable keel unit is attached to said at least partially buoyant structure via attachment means at a location located in said cavity;
c. A locking means which is capable of maintaining the keel unit in the non-deployed state comprising a keel nib and a ridge on the sidewall of the cavity, wherein said keel nib is formed on said at least two keel components;
d. A securing means which is capable of maintaining each keel component in the deployed state wherein the securing means comprises a groove in which at least one keel component is capable of resting while in the deployed state; and,
e. A tether unit attached to the at least partially buoyant structure.

21. The decoy device as in claim 20 wherein said attachment means comprises a hinge system further comprising at least one hinge body and at least one keel component connector, wherein said hinge body is attached to said at least partially buoyant structure at a location located in said cavity and mates with said keel connector.

22. The decoy device as in claim 20 wherein said base further defines an at least one access port in at least one side wall of said cavity which allows for access to a keel component when the keel component is in the non-deployed state.

\* \* \* \* \*